United States Patent
Lecomte et al.

(10) Patent No.: US 8,433,092 B2
(45) Date of Patent: *Apr. 30, 2013

(54) SCRAMBLING, DESCRAMBLING AND SECURED DISTRIBUTION OF AUDIO-VISUAL SEQUENCES FROM VIDEO CODERS BASED ON WAVELETS PROCESSING

(75) Inventors: Daniel Lecomte, Paris (FR); Jerome Caporossi, Bourg-la-Rein (FR)

(73) Assignee: Querell Data Limited Liability Company, Dover, DE (US)

( * ) Notice: Subject to any disclaimer, the term of this patent is extended or adjusted under 35 U.S.C. 154(b) by 796 days.

This patent is subject to a terminal disclaimer.

(21) Appl. No.: 12/632,832

(22) Filed: Dec. 8, 2009

(65) Prior Publication Data

US 2010/0142621 A1    Jun. 10, 2010

Related U.S. Application Data

(63) Continuation of application No. 10/552,384, filed as application No. PCT/FR2004/000947 on Apr. 16, 2004, now Pat. No. 7,668,312.

(30) Foreign Application Priority Data

Apr. 16, 2003  (FR) ..................................... 03 50110

(51) Int. Cl.
*H04N 7/167* (2011.01)
*H04N 7/10* (2006.01)
*G06F 9/00* (2006.01)

(52) U.S. Cl.
USPC ............. 382/100; 382/232; 380/210; 725/32

(58) Field of Classification Search .................. None
See application file for complete search history.

(56) References Cited

U.S. PATENT DOCUMENTS

| 6,370,197 | B1 | 4/2002 | Clark et al. |
| 6,571,014 | B1 | 5/2003 | Larkin |
| 7,382,969 | B2 | 6/2008 | Dawson |
| 7,668,312 | B2 * | 2/2010 | Lecomte et al. ............. 380/210 |
| 2001/0053222 | A1 | 12/2001 | Wakao et al. |

FOREIGN PATENT DOCUMENTS

| EP | 0734164 A2 | 9/1996 |
| EP | 1033880 A2 | 9/2000 |
| WO | WO-98/42098 A1 | 9/1998 |
| WO | WO-00/31964 A1 | 6/2000 |
| WO | WO-0197520 A2 | 12/2001 |

OTHER PUBLICATIONS

E. Moyano et al., "Efficient 3D Wavelet Transform Decomposition for Video Compression," Digital and Computational Video, 2001 Proceedings, Second International Workshop, Piscataway, NJ, USA, IEEE, Feb. 8, 2001, pp. 118-125.

"Medialiving, A New Concept in Data Protection," ISO/IEC JTC 1/SC 29/WGI, No. N2881, Mar. 11, 2003, pp. 1-10.

* cited by examiner

*Primary Examiner* — Kaveh Abrishamkar
(74) *Attorney, Agent, or Firm* — Novak Druce Connolly Bove + Quigg LLP

(57) ABSTRACT

A process for secured distribution of video sequences according to a digital stream format stemming from an encoding based on a processing by wavelets including frames including blocks containing coefficients of wavelets describing the visual elements, including analyzing the stream prior to transmission to client equipment to generate a modified main stream by deletion and replacement of selected information coding the original stream and having the format of the original stream, and complementary information of any format comprising the digital information coding the original stream and suitable for permitting reconstruction of the modified frames; and transmitting the modified main stream and the complementary information separately from a server to addressed equipment.

23 Claims, 1 Drawing Sheet

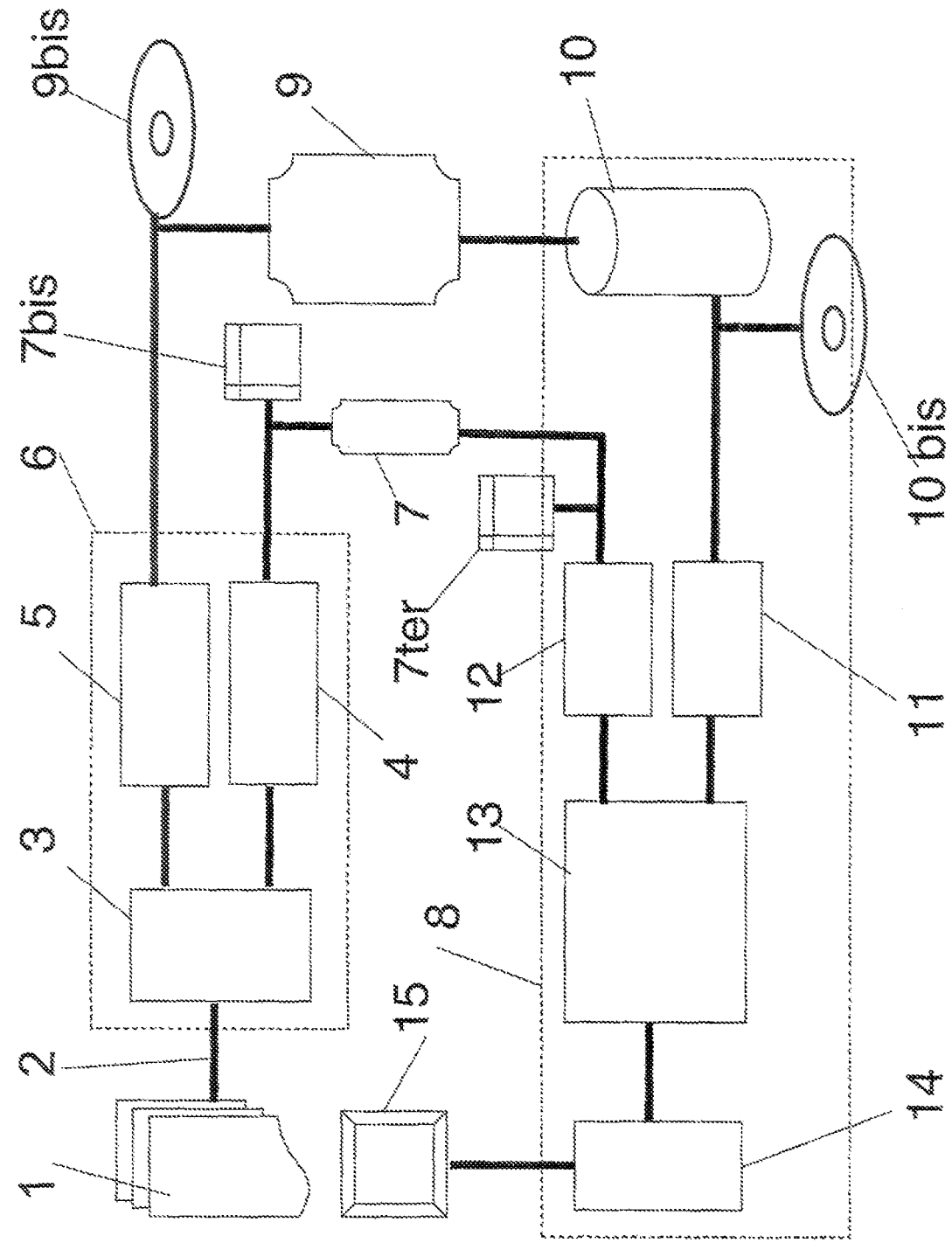

SCRAMBLING, DESCRAMBLING AND SECURED DISTRIBUTION OF AUDIO-VISUAL SEQUENCES FROM VIDEO CODERS BASED ON WAVELETS PROCESSING

RELATED APPLICATIONS

This application is a continuation application of U.S. patent application Ser. No. 10/552,384, filed Dec. 13, 2005, which is a 35 U.S.C. §371 National Stage Application of International Application No. PCT/FR2004/000947, filed Apr. 16, 2004 (WO 2004/095840, published Nov. 4, 2004), which claims priority from French Patent Application No. FR 03/50110, filed Apr. 16, 2003.

FIELD OF THE INVENTION

This invention relates to processing video sequences encoded with the aid of video coders based on wavelet technology.

BACKGROUND

It is possible with current systems to transmit films and audiovisual programs in digital form via broadcasting networks of the microwave (herzian), cable, satellite type, etc. or via telecommunication networks of the DSL (digital subscriber line) type or BLR (local radio loop) type or via DAB (digital audio broadcasting) networks, etc. Moreover, to avoid the pirating of works broadcast in this manner, the latter are frequently encrypted or scrambled by various well known means.

Concerning the processing of video sequences encoded with wavelet technology, U.S. Pat. No. 6,370,197 discloses a method of coding a video sequence based on a wavelet transform and generating a nested digital stream. It does not propose any method for protecting the stream and/or scrambling the video sequence.

EP 0734164 is also known and presents a process and a device for increasing the efficacy of coding brought about by video encoders based on the classified vectorial quantification by optimizing the coding in such a manner as to not have to transmit the classification information in the encoded binary stream. It applies to video streams stemming from a DCT transform or a wavelet transform. To this end the entering video signal is divided into a plurality of subbands, e.g., the DC coefficients are arranged in one subband and the AC coefficients in remaining subbands, followed by a formatting in blocks of identical size, each block of which includes a DC coefficient and a multitude of AC coefficients. A selection signal is then generated, representing the vectorial quantification class corresponding to each assembled block. This stage is followed by classification for the vectorial quantification by generation of parameters relative to the evolution of the DC coefficients in the horizontal and vertical directions, and by differential entropic encoding of the DC coefficients relative to the assembled blocks for generating a first encoded video signal. The AC coefficients are classified and encoded separately with the aid of an entropic encoding as a function of the selection information for generating a second encoded video signal. The two signals generated in this manner are formatted for the transmission.

For decoding, no classification information is transmitted. It is reconstructed from the DC coefficients encoded and transmitted to the decoder. That system concerns a process relative to the digital compression and the encoding of video streams stemming from the DCT transform and the wavelet transform. The description of the process indicates the stages to be applied for implementing a classified vectorial quantification that increases the compression and the effectiveness of the encoding. A single stream is transmitted to the receiver. The technical problem and the objective are to optimize the digital format and obtain a digital stream formatted at the output of a digital encoder. The process described in that system does not permit securing the video stream and does not offer protection against illicit uses of video streams stemming from encoding in wavelets.

As concerns the protection of images coded in wavelets, EP 1 033 880 discloses a process and device for protection by modifications applied to the spatial-frequency coefficients. These modifications are of the type: Modification of the sign bits of the coefficients, modification of the improvement bits of the coefficients, the choice of the appropriate coefficients belonging to a frequency subband for shifting (exchanging) them, rotation of a block regrouping the frequency coefficients arranged in increasing order while attempting to respect to the maximum the static properties and entropy of the original signal. Each type of modification is conditioned with the aid of a key. The data protected in this manner is then passed through an entropic encoder and a bitstream in conformity with the norm is generated. It encrypts with the aid of keys and, as a consequence, a single stream is transmitted to the receiver and all the elements constituting the original stream are located within the protected stream. It does not respond in a satisfactory manner to the protection of the transmitted video stream. Moreover, as a consequence of the modifications before the entropic encoding the statistical properties are modified and the size of the stream and the transmission rate increase. Consequently, it does not satisfy the objectives of high security that guarantee a process without loss, the subject matter of the present invention.

WO 00/31964 A discloses a method and equipment for the partial encrypting of images in order to protect them and to optimize the storage location. A first part of the image is compressed to a low quality without encryption and a second part of the image is encrypted. When the first and second part are reunited the image is obtained with maximal quality. The second part is encrypted and comprises two sections encrypted in different manners. The decryption of the first section and its combination with the first part restores the initial image with an average quality. The decryption of the second section, its combination with the first section and the first part restores the original image with maximal quality. The image can also be partitioned into multiple independent sections, each section of which is encrypted with its own method and its own key. The protection method is the encryption and consequently all the original elements of the stream remain within the protected stream and restoration of the entire content from only the protected stream is possible in the instance that an ill-disposed person finds or simulates the encryption keys. It does not furnish satisfactory security against pirating of the video stream. Also, the size of the protected stream is different from the size of the original stream. It therefore does not resolve the problem of high security while procuring a fine granularity in the quality of the reconstituted video sequences processed in the present invention.

US 2001/0053222 proposes a process and system for the protection of video streams encoded according to the MPEG-4 norm. The audiovisual stream is composed of several audio and video objects managed by a scenic composition. One of the objects of the video stream is encrypted with the aid of a key generated in four encryption stages that is periodically renewed. The protected objects are video objects. The encrypted object is multiplexed with the other objects and the entire stream is sent to the user. The MPEG-4 stream is recomposed in the addressed equipment by the decryption module, that reconstitutes the original video stream from the encrypted video stream and by regenerating the encryption key from encryption information previously sent and from information contained in the encrypted stream. Given that the entire protected content of the video objects is located in the stream sent to the user, an ill-intentioned person who finds the encryption keys would be able to decrypt this protected content and to view or broadcast it. It does not entirely resolve the problem of securing the video stream.

SUMMARY OF THE INVENTION

This invention relates to a process for secured distribution of video sequences according to a digital stream format stemming from an encoding based on a processing by wavelets including frames including blocks containing coefficients of wavelets describing the visual elements, including analyzing the stream prior to transmission to client equipment to generate a modified main stream by deletion and replacement of selected information coding the original stream and having the format of the original stream, and complementary information of any format including the digital information coding the original stream and suitable for permitting reconstruction of the modified frames, and transmitting the modified main stream and the complementary information separately from a server to addressed equipment.

This invention also relates to a system for fabricating a video stream that runs the process, including at least one multimedia server containing original video sequences; a device for analyzing the video stream; a device for separating the original video stream into a modified main stream by deletion and replacement of selected information coding the original visual signal and into complementary information as a function of this analysis; and at least one device in addressed equipment for reconstruction of the video stream as a function of the modified main stream and the complementary information.

BRIEF DESCRIPTION OF THE DRAWING

In the attached drawing, FIG. 1 represents a particular selected aspect of a client-server system.

DETAILED DESCRIPTION

The invention will be better understood from a reading of the following description of a non-limiting example that refers to FIG. 1 describing the total architecture of a system for implementing a selected process of aspects of the invention.

The process in conformance with selected aspects of this invention ensures a high level of protection while reducing the volume of information necessary to have access to the original content from the protected content.

The protection is based on the principle of the deletion (removal) and replacement of certain information coding the original visual signal by any method, e.g.: Substitution, modification, permutation, swapping, shifting or movement of the information. This protection is also based on a knowledge of the structure of the binary stream at the output of the wavelet-based visual encoder.

The invention relates to a general principle of a process for securing an audiovisual stream. Video services can be authorized on demand and a la carte via all the broadcasting networks and the local recording in the digital decoder box of the user, as well as the direct viewing of television channels. A solution comprises extracting and permanently preserving outside of the user's dwelling and, in fact, in the broadcasting and transmitting network, a part of the digital audiovisual stream recorded at the client's or directly broadcasted, which part is of primary importance for viewing the digital audiovisual stream on a television screen or monitor type screen, but which has a very small volume relative to the total volume of the digital audiovisual stream recorded at the user's or received in real time. The lacking part will be transmitted via the broadcasting or transmitting network at the moment of viewing the digital audiovisual stream.

The invention relates in particular to a device capable of securely transmitting a set of video streams with a high visual quality to a viewing screen of the television screen type and/or for being recorded on the hard disk or on any other recording support of a box connecting the telecommunication network to a viewing screen such as a television screen or a personal computer monitor while preserving the audiovisual quality, but avoiding fraudulent use such as the possibility of making pirated copies of films or audiovisual programs recorded on the hard disk or other recording support of the decoder box. The invention also concerns a client-server system, in which the server supplies the stream permitting viewing of the secured distribution video film and the client reads and displays the digital audiovisual stream.

Once the digital audiovisual stream has been modified and separated into two parts the larger part of the modified audiovisual stream, called "modified main stream" will be transmitted via a classic broadcasting network, whereas the remaining part, called "complementary information," will be sent on demand via a narrow-band telecommunication network such as the classic telephone networks or cellular networks of the GSM, GPRS or BLR types, or also by using a subset of the bandwidth shared on a cable network. The original digital audio stream is reconstituted in the addressed equipment (decoder) by a synthesis module from the modified main stream and the complementary information.

The protection system comprises an analysis—scrambling and descrambling module based on a digital format stemming from encoding a video stream based on wavelet transforms. The analysis and scrambling module is based on substitution by "decoys" or modification of part of the coefficients stemming from the transformation in wavelets. The fact of having removed and substituted part of the original data of the original digital stream during the generation of the modified main stream does not allow restoration of the original stream only from the data of the modified main stream. Several variants of the scrambling and descrambling process are implemented and illustrated with exemplary embodiments by the characteristics of "scalability" of the wavelet transform, which notion of "scalability" is defined from the English expression "scalability," that characterizes an encoder capable of encoding or a decoder capable of decoding an ordered set of digital streams in such a manner as to produce or reconstitute a multilayer sequence.

In one aspect, the invention relates a process for the secured distribution of video sequences according to a digital stream format stemming from an encoding based on a processing by wavelets, constituted of frames comprising blocks containing coefficients of wavelets describing the visual elements, wherein an analysis of the stream is made prior to the transmission to the client equipment to generate a modified main stream by deletion and replacement of certain information coding the original stream and presenting the format of the original stream, and complementary information of any format comprising the digital information coding the original stream and suitable for permitting the reconstruction of the modified frames, then the modified main stream and the complementary information are transmitted separately from the server to the addressed equipment.

The protection is brought about by deletion of the original elements and substituting them with decoys, which original extracted elements are stored separately in the complementary information. The fact of having removed and substituted a part of the original data of the original video stream during generation of the modified main stream does not allow the restoration of the original stream from only the data of the modified main stream.

The video stream is entirely protected (all the subbands) and transmitted via the network or via a physical support to the user, independently of user rights. Partial restoration is carried out via sending part of the complementary information containing the original elements either directly or in a progressive mode.

The analysis and scrambling module decides how to visually degrade the video stream as a function of its structure and properties of scalability resulting from the transform in wavelets. The study concerns the impact of the modification of different parts of the stream (coefficients, subbands, layers of scalability, zones of interest) on the visual degradation.

Scrambling is preferably carried out by modifying the wavelet coefficients belonging to at least one temporal subband resulting from the temporal analysis. Scrambling is advantageously brought about by modifying coefficients of wavelets belonging to at least one spatial subband resulting from the spatial analysis of a temporal subband. Scrambling is also advantageously brought about by modifying coefficients of wavelets belonging to at least one temporal subband resulting from a temporal analysis of one spatial subband.

The wavelet coefficients to be modified are advantageously selected according to laws that are random and/or defined a priori.

According to particular aspects, the parameters for the scrambling are a function of the properties of temporal scalability and/or of spatial scalability and/or of qualitative scalability and/or of transmission rate scalability and/or of scalability by regions of interest offered by the digital streams generated by the wavelet-based coders.

The visual intensity of degradation of the video sequences obtained is advantageously determined by the quantity of modified wavelet coefficients in each spatial-temporal subband. Intensity of the visual degradation of the video sequences decoded from the modified main stream is advantageously a function of the position in the original digital stream of the modified data, which data represents, according to its positions, the values quantified according to different precisions (accuracies) of the wavelet coefficients belonging to a spatial-temporal subband. Intensity of the visual degradation of the video sequences decoded from the modified main stream is advantageously determined according to which quality layer of the modified wavelet coefficients they belong to in each spatial-temporal subband.

The modification of the wavelet coefficients may be carried out directly in the binary stream. The wavelet coefficients may be carried out with a partial decoding. Modification of the wavelet coefficients may be carried out during coding or by carrying out a decoding then a complete re-encoding.

The size of the modified main stream may be strictly identical to the size of the original digital video stream.

Substitution of the wavelet coefficients may be carried out with random or calculated values.

Duration of the visual scrambling obtained in a group of frames is preferably determined as a function of the temporal subband to which the modified wavelet coefficients belong. Visual scrambling obtained in a group of frames may be limited spatially in a region of interest of each frame.

In addition, complementary information is organized in layers of temporal and/or spatial and/or qualitative and/or transmission rate scalability and/or scalability by region of interest. The stream may be progressively descrambled with different layers of quality and/or resolution and/or frame rate and/or according to a region of interest via the sending of certain parts of the complementary information corresponding to the layers of qualitative and/or spatial and/or temporal scalability and/or scalability for a region of interest.

The stream may also be partially descrambled according to different levels of quality and/or resolution and/or frame rate and/or according to a region of interest via sending part of the complementary information corresponding to the layer or layers of qualitative and/or spatial and/or temporal scalability and/or scalability for this region of interest.

A synthesis of a digital stream in the original format is calculated in the addressed equipment as a function of the modified main stream and the complementary information. The transmission of the modified main stream may be realized via a physically distributed material support (CD-ROM, DVD, hard disk, flash memory card).

The modified main stream may undergo operations of transcoding, rearrangement and/or extraction of frames or groups of frames during its transmission. Transmission of the complementary information may be realized via a physically distributed support material (flash memory card, smart card).

Modification of the wavelet coefficients is preferably perfectly reversible (lossless process) and the digital stream reconstituted from the modified main stream and the complementary information is strictly identical to the original stream.

Modification of the wavelet coefficients is advantageously perfectly reversible (lossless process) and the portion of the digital stream reconstituted from the modified main stream and the complementary information is strictly identical to the corresponding portion in the original stream.

Reconstitution of a descrambled video stream may be controlled and/or limited in terms of predefined frame rate and/or resolution and/or transmission rate and/or quality as a function of the user rights.

Reconstitution of a descrambled video stream may be limited in terms of frame rate and/or resolution and/or transmission rate and/or quality as a function of the viewing apparatus on which it is visualized. Reconstitution the descrambled video stream may be carried out in a progressive manner in stages up to the reconstitution of the original video stream.

Another aspect of the invention also relates to a system for the fabrication of a video stream comprising at least one multimedia server containing the original video sequences and comprising a device for analyzing the video stream, a device for separating the original video stream into a modified main stream by deletion and replacement of certain information coding the original visual signal and into complementary information as a function of the analysis, and at least one device in the addressed equipment for reconstruction of the video stream as a function of the modified main stream and the complementary information.

Protection of the visual streams is worked out based on the structure of the binary streams and their characteristics due to the encoding based on wavelets. One aspect of this structure is as follows.

A video coder based on processing by wavelets realizes a temporal and spatial decomposition of an initial video sequence to obtain a set of coefficients of spatial-temporal wavelets. These coefficients are then quantified, and coded by an entropic coder to generate one or several nested binary streams possessing properties of temporal scalability and/or spatial (or resolution) scalability and/or qualitative scalability and/or transmission rate scalability and/or scalability of regions of interest.

The property of temporal scalability is the possibility of decoding from a single or several nested binary streams video sequences of which the display frequency of the frames (number of frames per second) is variable.

Known literature employs the notions of "frames" and "frame rate" (number of frames per second), which notions will be used in the following for descriptive purposes.

The property of spatial scalability is the possibility of decoding from a single or several nested binary streams video sequences of which the spatial (size) resolution of the frames is variable.

The property of qualitative scalability is the possibility of decoding from a single or several nested binary streams video sequences of which the visual quality of the frames, measured according to objective and/or subjective criteria, is variable.

The property of transmission rate scalability is the possibility of decoding from a single or several nested binary streams video sequences according to an average transmission rate (average number of information bits per second).

The property of scalability by region of interest is the possibility of decoding from a single or several nested binary streams one or several targeted zones in the video sequence.

During encoding, an original video sequence is segmented into groups of N successive frames called GOF (group of frames), and each GOF is then processed in an independent manner during the encoding. Note a GOF with length N GOF=($F_0$, $F_1$, ..., $F_{N-1}$), $F_i$ being the frames for i= 0.1, 2, ... N−1. The spatial-temporal wavelet coefficients are generated in two successive stages and in accordance with a spatial and temporal analysis of the frames of the GOF.

The first stage comprises performing a temporal analysis of the N frames of each GOF in accordance with the estimated direction of the movement (temporal analysis with estimation of movement) to remove temporal redundancies and spatially concentrate the energy and information due to the movement in the frames stemming from the temporal analysis. This temporal analysis can be performed according to different spatial resolutions and after decomposition into wavelets of each frame of the GOF. The estimation of movement is performed independently within each spatial subband (multi-resolution estimation of movement).

The second stage comprises performing a spatial analysis of the N frames resulting from the temporal analysis with the aid of a decomposition into wavelets to remove the spatial redundancies and concentrate the energy due to spatial discontinuities present in each frame.

The temporal analysis is performed in several iterations.

In the first iteration, p successive frames of the original GOF are analyzed with predefined wavelet filters $f_L$ and $f_H$ with length p and after estimation and compensation of the movement for each frame and in relation to one or several frames called reference frames. Generally, p=2 and two successive frames ($F_{2i}$, $F_{2i+1}$), i=0, ..., N/2 are filtered and engender a frame called "low-frequency" or "average" and noted (written) $L_i=f_L(F_{2i}, F_{2i+1})$ and a frame called "high-frequency" and or "difference" and noted $H_i=f_H(F_{2i}, F_{2i+1})$. Thus, at the first iteration of the temporal analysis stage a subset t-$L_1$ of frames of type L with length N/2 and a subset t-$H_1$ of frames of type H with length N/2 are generated such as t-$L_1$=($L_0$, $L_1$, ..., $L_{N/2}$), t-$H_1$=($H_0$, $H_1$, ..., $H_{N/2}$).

At each following iteration k>1 the estimation/compensation of movement and temporal filtering are iterated for the subset of frames t-$L_{k-1}$ of type L obtained in the iteration k−1 and two new subsets of frames t-$L_k$ and t-$H_k$ are generated whose length (number of frames) is reduced by a factor of 2 relative to t-$L_{k-1}$. In certain instances, the iteration also relates to the subset of frames t-$H_{k-1}$.

The total number of iterations during the temporal analysis is noted $n_T$. It is comprised between 1 and N/2. $n_{T+1}$ temporal subbands are generated at the end of the temporal analysis.

For example, with N=16 and $n_T$=4:

$$L_i^k = f_L(L_{2i}^{k-1}, L_{2i+1}^{k-1}),$$

$$H_i^k = f_H(L_{2i}^{k-1}, L_{2i+1}^{k-1})$$

| GOF = ($F_0$, $F_1$, ..., $F_{15}$) | | | | |
|---|---|---|---|---|
| t-$L_1$ = ($L_0$, ..., $L_7$) | | | | t-$H_1$ = ($H_0$, ..., $H_7$) |
| t-$L_2$ = ($LL_0$, ..., LL3) | | | t-$H_2$ = ($LH_0$, ..., $LH_3$) | |
| t-$L_3$ = ($LLL_0$, $LLL_1$) | | t-$H_3$ = ($LLH_0$, $LLH_1$) | | |
| t-$L_4$ = ($LLLL_0$) | t-$H_4$ = ($LLLH_0$) | | | |

The temporal analysis of a GOF with length N=16 with $n_T$=4 therefore generates 16 new frames divided into $n_T$+1=4+1=5 temporal subbands:

Subband t-$L_4$: 1 frame of type L: $LLLL_0$,
Subband t-$H_4$: 1 frame of type H: $LLLH_0$,
Subband t-$H_3$: 2 frames of type H: $LLH_0$, $LLH_1$,
Subband t-$H_2$: 4 frames of type H: $LH_0$, ..., $LH_3$,
Subband t-$H_1$: 8 frames of type H: $H_0$, ..., $H_7$.

The spatial analysis is then performed on each of the frames belonging to each temporal subband t-$L_i$ and t-$H_i$: Each frame is decomposed with the aid of a wavelet transform discrete at D levels, thus generating 3×D+1 spatial subbands of wavelet coefficients for each frame. These spatial subbands are noted s-$LL_0$, s-$HL_1$, s-$LH_1$, s-$HH_1$, s-$HL_2$, s-$LH_2$, s-$HH_2$, ..., s-$HL_D$, s-$LH_D$, S-$HH_D$.

At the end of the temporal and spatial analyses ($n_{T+1}$)× (3D+1) spatial-temporal subbands of wavelet coefficients are available:

t-$L_{nT}$(s-$LL_0$), t-$L_{nT}$(s-$HL_1$), t-$L_{nT}$(s-$LH_1$), t-$L_{nT}$(s-$HH_1$), ..., t-$L_{nT}$(s-$HL_D$), t-$L_{nT}$(s-$LH_D$), t-$L_{nT}$(s-$HH_D$),
t-$H_{nT}$(s-$LL_0$), t-$H_{nT}$(s-$HL_1$), t-$H_{nT}$(s-$LH_1$), t-$H_{nT}$(s-$HH_1$), ..., t-$H_{nT}$(s-$HL_D$), t-$H_{nT}$(s-$LH_D$), t-$H_{nT}$(s-$HH_D$),
...
t-$H_1$(s-$LL_0$), t-$H_1$(s-$HL_1$), t-$H_1$(s-$LH_1$), t-$H_1$(s-$HH_1$), ..., t-$H_1$(s-$HL_D$), t-$H_1$(s-$LH_D$), t-$H_1$(s-$HH_D$).

The wavelet coefficients of each spatial-temporal subbands are then compressed progressively by bit plane with the aid of an entropic coder with the task of removing the statistical redundancies existing in a fixed set of wavelet coefficients. The entropic coder generates a binary stream for each set of independently coded wavelet coefficients which binary stream can be sectioned into several substreams divided according to different quality layers.

After an analysis of the structure in subbands previously described, the analysis and scrambling module performs modifications (by permutation and/or substitution and/or thresholding) of a subset of the wavelet coefficients belonging to one or several spatial-temporal subbands. These modifications introduce a visually perceptible degradation (scrambling) of the video sequence decoded from these modified coefficients. A control (verification or check) of the spatial and/or temporal extent and/or according to the layers of quality of the scrambling as well as a control of the intensity of the degradation due to the scrambling are possible as a function of the number of modified coefficients, their localizations in a spatial subband, their belonging to the spatial-temporal subbands, their belonging to one or several quality layers, their position in the set of coefficients belonging to a single spatial-temporal subband and of the type of modification.

The $N/l_x$ consecutive frames of the GOF are scrambled by modifying the wavelet coefficients in spatial subbands of a temporal subband t-X with length l, (i.e., containing $l_x$ frames).

Selection of the type of spatial subband to which the wavelet coefficients (s-HL of s-LH or s-HH) belong permits a control of the visual aspect of the scrambling: For the s-HL subband artifacts of vertical direction appear on the frames (degradation of the vertical spatial discontinuities), for the s-LH subband horizontal artifacts appear (degradation of the horizontal spatial discontinuities) and for the s-HH subband artifacts of the "checkerboard" type appear (conjoined degradations of the horizontal and vertical spatial discontinuities).

The selection of the level of resolution r to which the spatial subband ($s-LL_r$ or $s-HL_r$ or $s-LH_r$ or $s-HH_r$) belongs permits a control of the spatial extent of the scrambling engendered by the modification of the wavelet coefficients: The closer r is to 0, the greater the spatial extent.

A modification of the wavelet coefficients belonging to a subband with resolution r>0 generates a scrambling that is visible on all the frames decoded with spatial resolutions greater than r+1, r+2, . . . , R.

A modification of the wavelet coefficient belonging to a quality layer q generates a scrambling that is visible on all the decoded frames considering at least the q first quality layers.

Modification of the spatial-temporal wavelet coefficients is performed after a partial decoding of the binary stream generated in accordance with a standard or norm or an algorithm or an encoding format. Once the modification has been made, a re-encoding of the coefficients is performed to generate a binary stream with the identical size that respects the conformity relative to the standard or norm or algorithm or encoding format that generated the original binary stream.

Subunits of bits inside the original binary stream representing the coded spatial-, temporal wavelet coefficients are modified without decoding and without disturbing the conformity of the stream relative to the standard or norm or algorithm or encoding format that generated the original binary stream.

Selection of the spatial-temporal wavelet coefficients to be modified in a spatial-temporal subband is made in a manner that is random and/or in accordance with previously defined rules.

The modified main stream advantageously has a size identical to that of the original video stream.

The scrambling generated in this manner has properties of temporal, spatial, qualitative and transmission rate scalability and scalability by zone of interest.

The complementary information relative to the scrambling generated is advantageously organized in layers of temporal, spatial, qualitative and transmission rate scalability and scalability by zone of interest.

The scrambling has, as a function of the number of GOF and/or of the number of frames scrambled in a GOF, a temporal scalability comprised between: "All the frames of all the GOFs (maximal scrambling)" and "no frame of any GOF" (non-scrambled sequence).

The scrambling has, as a function of the resolutions of the spatial subbands to which the modified wavelet coefficients belong, a spatial scalability comprised between: "All the resolutions are scrambled" (i.e., from resolution r=0 to resolution r=R) and "none of the resolutions is scrambled."

The scrambling has, as a function of the number of modified wavelet coefficients and of the resolutions of the spatial subbands to which they belong, a qualitative scalability ranging from: "The entirety of each frame is scrambled," "certain spatial regions of each frame are scrambled" (regions of interest) and "no scrambling was applied to the frames."

In a reciprocal manner, descrambling also has the different scalabilities stated (temporal, spatial, qualitative and transmission rate and by zone of interest).

Descrambling advantageously permits the different scalabilities stated (temporal, spatial, qualitative and transmission rate and by zone of interest) to be addressed by virtue of the sending of certain parts of the complementary information corresponding to different layers of scalability (temporal, spatial, qualitative and transmission rate and by zone of interest), thus giving access to different level of quality/resolution/frame rate for the video sequence decoded from the partially descrambled stream.

The different levels of quality/resolution/frame rate of the video sequence are advantageously obtained from the partially descrambled stream via the sending of a part of the complementary information by layer of scalability (temporal, spatial, qualitative and transmission rate and by zone of interest).

The principle of scrambling and of descrambling based on these different scalabilities will be better understood with the aid of the following preferred, non-limiting example.

The original stream 1 is directly in digital or analog form. In the latter instance, the analog stream is converted by a wavelet-based coder (not shown) into a digital format 2. The video stream to be secured 2 is passed to analysis and scrambling module 3 that generates a modified main stream 5 in the identical format as input stream 2 aside from the fact that certain coefficients were replaced by values different than the original ones and is stored in server 6. Complementary information 4 of any format is also placed in server 6 and contains information relative to the elements of the images that were modified, replaced, substituted or moved and to their value or location in the original stream.

Stream 5, with a format identical to the original stream, is then transmitted via high line speed network 9 of the microwave, hertzian, cable, satellite type or the like to the terminal of spectator 8 and more precisely onto hard disk 10. When spectator 8 request to view the film present on hard disk 10, two things are possible: Either spectator 8 does not have all the rights necessary for viewing the film in which case video stream 5 generated by scrambling module 3 present on hard disk 10 is passed to synthesis system 13 via reading buffer memory 11 that does not modify it and transmits it identically to a display reader capable of decoding it 14, and its content, degraded visually by scrambling module 3, is displayed on viewing screen 15. Video stream 5 generated by scrambling module 3 is passed directly via network 9 to reading buffer memory 11 and then to synthesis system 13.

Video stream 5 advantageously undergoes a series of operations of transcoding and rearrangement of its frames or groups of frames in network 9.

Or, the server decides that spectator 8 has the right to correctly view the film. In this instance, synthesis module 13 makes a viewing request to server 6 containing the complementary information necessary 4 for reconstitution of original video 2. Server 6 then sends complementary information 4 via telecommunication network 7 of an analog or digital telephone line type, DSL (digital subscriber line) or BLR (local radio loop), via DAB (digital audio broadcasting) networks or via digital mobile telecommunication networks (GSM, GPRS, UMTS), which complementary information 4 permits reconstitution of the original video in such a manner that spectator 8 can store it in a buffer memory 12. Synthesis module 13 then proceeds to a restoration of the scrambled video stream that it reads in its reading buffer memory 11, and modified fields whose positions it knows as well as the original values are restored by virtue of the content of the complementary information read in descrambling buffer memory 12. The quantity of information contained in complementary information 4 that is sent to the descrambling module is specific, adaptive and progressive for each spectator and depends on rights, e.g., single or multiple use, right to make one or more private copies, delayed payment or payment in advance. The level (quality, quantity, type) of complementary information is also determined as a function of the visual quality required by the user. The wave-based video coding characterized by the previously described scalabilities permits the restoration of the video stream with levels of quality, resolution and frequency of different frames.

Modified main stream 5 is advantageously passed directly via network 9 to reading buffer memory 11, then to synthesis module 13.

Modified main stream 5 is advantageously inscribed (recorded) on a physical support such as a CD-ROM or DVD, hard disk, flash memory card or the like (9bis). Modified main stream 5 is then read from physical support 9bis by disk reader 10bis of box 8 to be transmitted to reading buffer memory 11, then to synthesis module 13.

Complementary information 4 is advantageously recorded on a physical support 7bis with a credit card format constituted of a smart card or a flash memory card. This card Ibis will be read by module 12 of device 8 comprising card reader 7ter.

Card 7bis may contain the applications and the algorithms that will be executed by synthesis system 13.

Device 8 is advantageously an autonomous, portable and mobile system.

The functioning of analysis and scrambling module 3 illustrating the selection of the scrambling performed will now be described in detail. The original video sequence is segmented into GOF with N=16 frames. The temporal analysis with $n_T=4$ iterations generates $n_T+1=5$ temporal subbands respectively processing:

Subband $t-L_4$: 1 frame of type L: $LLLL_0$,
Subband $t-H_4$: 1 frame of type H: $LLLH_0$,
Subband $t-H_3$: 2 frames of type H: $LLH_0$, $LLH_1$,
Subband $t-H_2$: 4 frames of type H: $LH_0$, $LH_1$, $LH_2$, $LH_3$,
Subband $t-H_1$: 8 frames of type H: $H_0$, $H_1$, $H_3$, $H_4$, $H_5$, $H_6$, $H_7$.

The decomposition into five temporal subbands offers the possibility of restoring the initial video sequence according to five different frame rates. Each frame of resolution R in each temporal subband t-X is then decomposed spatially by a wavelet transform at D=4 levels, which yields the possibility of reconstituting the image with five different resolutions, thus generating for each $3 \times D+1=13$ spatial subbands: $LL_0$, $LH_1$, $HL_1$, $HH_1$, $LH_2$, $HL_2$, $HH_2$, $LH_3$, $HL_3$, $HH_3$, $LH_4$, $HL_4$, $HH_4$.

As a consequence of such an encoding, the video sequence can therefore be decoded according to frame rates from $1/16 \times fr_0$ to $fr_0$, in which $fr_0$ is the frame rate of the original video sequence as well as according to D+1=5 resolutions.

The scrambling of the video sequence is performed for each GOF in the following manner:

In the temporal subband $t-L_4$ the wavelet coefficients of spatial subbands $s-HH_2$ and $s-HH_3$ resulting from the spatial decomposition into wavelets of frame $LLLL_0$ are extracted and replaced by random or calculated values.

In the temporal subband $t-H_3$ the wavelet coefficients of spatial subband $s-HH_3$ resulting from the spatial decomposition into wavelets of frame $LLH_0$ are extracted and replaced by random or calculated values.

In the temporal subband $t-H_1$ the wavelet coefficients of spatial subband $S-HH_3$ resulting from the spatial decomposition into wavelets of frame $LH_0$ are extracted and replaced by random or calculated values.

In the temporal subband $t-H_o$ the wavelet coefficients of spatial subbands $s-HH_3$ resulting from the spatial decomposition into wavelets of frame $H_o$ are extracted and replaced by random or calculated values.

The video sequence decoded from the modified main stream is thus totally scrambled unless it is decoded at frame rates equal to $1/16 \times fr_0$ and $1/8 \times fr_0$ (decoding solely from respectively temporal subbands $s-LL_0$, $s-LH_1$, $s-HL_1$ and $s-HH_1$ that were not modified). Thus, modifications are made in all the temporal bands but not at all the resolutions. Leaving non-modified resolutions makes it possible to reconstitute the video stream from the scrambled stream, but at a quality that is distinctly less than that of the original video stream.

The scrambled stream is transmitted to client 8 upon request and descrambling is then performed, e.g., in five stages corresponding to different levels of quality obtained after each descrambling stage. Descrambling of one or more layers of scalability is carried out and the quality of the film viewed is controlled by the server as a function of the rights of the user and the quality required by the user.

Descrambling is advantageously expressed by a progressive attenuation of the degradation in time until reconstitution of the original content with high visual quality. For example, the first descrambling stage comprises restoring the wavelet coefficients of spatial subband $s-HH_2$ for temporal subband $t-L_4$. Scrambling the video sequence decoded for a maximum resolution R and at a maximum frame rate of $fr_0$ is then less extended spatially and more concentrated around the spatial discontinuities of each frame. The video sequence decoded for the frame rates $1/16 \times fr_0$ or $1/8 \times fr_0$ and for resolutions r=R/16, R/8, R/4 is, on the other hand, not scrambled at all. The visual quality of the partially descrambled film is minimal and the film can not be used visually at its full resolution and at its original frame rate. This stage serves to identify the server of complementary information during establishment of the connection.

The second descrambling stage comprises restoring the wavelet coefficients of spatial subband s-$HH_3$ for temporal subband t-$L_4$. Scrambling the video sequence decoded for a resolution R and at a maximum frame rate of $fr_0$ is then less extended spatially and more concentrated around the spatial discontinuities of each frame. Furthermore, the video sequence is now scrambled only for a duration equivalent to one half of a GOF (8 frames of 16). The video sequence decoded for frame rates $1/16 \times fr_0$ or $1/8 \times fr_0$ and resolutions r=R/16, R/8, R/4 is not scrambled. This stage serves to enable user 8 to partially perceive the video film to decide whether the user wants to obtain the rights to see the film. After confirmation of the client stages three, four or five are carried out as a function of the payment made. The third descrambling stage comprises restoring the wavelet coefficients of spatial subband s-$HH_3$ for temporal subband t-$H_3$. The video sequence is now scrambled only for a duration equivalent to one quarter of a GOF (4 frames out of 16). The video sequence decoded for the frame rates $1/16 \times fr_0$, $1/8 \times fr_0$, $1/4 \times fr_0$ and for resolutions r=R/16, R/8, R/4 is not scrambled. The film can be viewed visually but it has a low quality.

The fourth descrambling state comprises restoring the wavelet coefficients of spatial subband s-$HH_3$ for temporal subband t-$H_2$. The video sequence is now scrambled only for a duration equivalent to one eighth of a GOF (2 frames out of 16). The video sequence decoded for frame rates $1/16 \times fr_0$, $1/8 \times fr_0$, $1/4 \times fr_0$, $1/2 \times fr_0$ and for resolutions r=R/16, R/8, R/4 is not scrambled. The visual quality of the restored film is average. For these $3^{rd}$ and $4^{th}$ descrambling stages the video film remains at full resolution and remains partially scrambled for the original frame rate, but it is possible to extract video streams from these stages with resolutions and frame rates lower than those of the original film. This yields the possibility of supplying versions of the same video stream with a lesser resolution and therefore a lower price and with better control of the access.

The fifth descrambling stage comprises restoring the wavelet coefficients of spatial subband s-$HH_3$ for temporal subband t-$H_1$. The video sequence is now totally descrambled, whatever the frame rate of decoding and the resolution. The reconstituted video stream is strictly identical to the original video stream.

We claim as follows:

1. A process, comprising:
   obtaining a temporal and spatial decomposition of an initial video sequence to obtain a set of coefficients of spatial-temporal wavelets;
   quantifying and coding the coefficients to generate a digital stream;
   using information associated with a structure of the digital stream to process the digital stream to generate a modified digital stream by replacing selected information in the digital stream, and to generate complementary information including the selected information, the complementary information being suitable for permitting reconstruction of the digital stream using the modified digital stream; and
   transmitting the modified digital stream and the complementary information separately from a server to client equipment.

2. The process of claim 1, wherein the replacing is based on knowledge of a structure of a binary stream outputted by a wavelet-based visual encoder.

3. The process of claim 1, wherein the replacing comprises at least one of substitution, modification, permutation or movement of the selected information.

4. The process of claim 1, wherein a volume of the complementary information is smaller than that of the modified digital stream.

5. The process of claim 1, further comprising transmitting the complementary information to the client equipment in response to commencement of viewing a digital audio-visual stream on the client equipment.

6. The process of claim 1, further comprising transmitting the complementary information to the client equipment based on a request from the client equipment.

7. The process of claim 1, wherein the encoding further comprises encoding an ordered set of digital stream to reconstitute a multilayer sequence.

8. The process of claim 1, wherein the processing further comprises determining how to visually degrade video sequences as a function of a structure and properties of the digital stream resulting from transform in wavelets.

9. An apparatus, comprising:
   a video coder configured to obtain a temporal and spatial decomposition of an initial video sequence to obtain a set of coefficients of spatial-temporal wavelets;
   an entropic coder configured to quantify and code the coefficients to generate at least one nested binary stream, wherein the nested binary stream is formed of video sequences in a digital stream format;
   a processing module configured to use a structure associated with the nested binary stream to separate the nested binary stream into a modified digital stream, by replacing selected information, and into complementary information including the selected information, the complementary information being suitable for permitting reconstruction of a pre-modified digital stream using the modified digital stream; and
   a transmission unit configured to transmit the modified digital stream and the complementary information to at least one client equipment, separately, to permit reconstruction of the original video stream as a function of the modified digital stream and the complementary information.

10. The apparatus of claim 9, wherein the nested binary stream has properties that include at least one of temporal scalability, spatial scalability, qualitative scalability, transmission rate scalability, or scalability of regions.

11. The apparatus of claim 9, wherein the entropic coder is configured to generate at least one nested binary stream possessing temporal scalability by decoding, from the at least one nested binary stream, video sequences of which a display frequency of a number of frames per second is variable.

12. The apparatus of claim 9, wherein the entropic coder is configured to generate at least one nested binary stream possessing spatial scalability by decoding, from the at least one nested binary stream, video sequences of which a spatial resolution of frames is variable.

13. The apparatus of claim 9, wherein the entropic coder is configured to generate at least one nested binary stream possessing qualitative scalability by decoding, from the at least one nested binary stream, video sequences of which a visual quality for frames is variable.

14. The apparatus of claim 9, wherein the entropic coder is configured to generate at least one nested binary stream possessing transmission rate scalability by decoding, from the at least one nested binary stream, video sequences according to an average transmission rate.

15. The apparatus of claim 9, wherein the entropic coder is configured to generate at least one nested binary stream possessing scalability by region of interest by decoding, from the at least one nested binary stream, at least one targeted zone in a video sequence.

16. The apparatus of claim 9, wherein the video coder is configured to segment an original video sequence into groups of successive frames, wherein the successive frames are processed in an independent manner during encoding, and wherein spatial-temporal wavelet coefficients are generated in two successive stages in accordance with a spatial and temporal analysis of frames of the group of successive frames.

17. The apparatus of claim 16, wherein the video coder is configured to perform temporal analysis of the group of successive frames in a first stage in accordance with an estimated direction of movement to remove temporal redundancies, and is configured to spatially concentrate energy and information due to movement in the frames stemming from the temporal analysis.

18. The apparatus of claim 17, wherein the temporal analysis is performed according to different spatial resolutions and after decomposition of the frames of the group of frames into wavelets.

19. The apparatus of claim 17, wherein the video coder is configured to estimate the direction of movement independently within a plurality of spatial subbands.

20. The apparatus of claim 17, wherein the video coder is configured to perform spatial analysis of frames resulting from the temporal analysis in a second stage.

21. The apparatus of claim 16, wherein the entropic coder is configured to compress wavelet coefficients of at least one spatial-temporal subband progressively by bit plane to remove statistical redundancies existing in a fixed set of wavelet coefficients.

22. The apparatus of claim 21, wherein the processing module is configured to generate the modified digital stream by modifying a subset of wavelet coefficients belonging to at least one spatial-temporal subband.

23. An article of manufacture including a computer readable medium having instructions stored thereon that, in response to execution on a computing device, cause the computing device to perform a method comprising:
  obtaining a temporal and spatial decomposition of an initial video sequence to obtain a set of coefficients of spatial-temporal wavelets;
  quantifying and coding the coefficients to generate a digital stream;
  using information associated with a structure of the digital stream to process the digital stream to generate a modified digital stream by replacing selected information in the digital stream, and to generate complementary information including the selected information, the complementary information being suitable for permitting reconstruction of the digital stream using the modified digital stream; and
  transmitting the modified digital stream and the complementary information separately from a server to client equipment.

* * * * *

UNITED STATES PATENT AND TRADEMARK OFFICE
CERTIFICATE OF CORRECTION

PATENT NO. : 8,433,092 B2  
APPLICATION NO. : 12/632832  
DATED : April 30, 2013  
INVENTOR(S) : Lecomte et al.

Page 1 of 1

It is certified that error appears in the above-identified patent and that said Letters Patent is hereby corrected as shown below:

On the Title Page, in Item [75], under "Inventors", in Column 1, Line 2, delete "Bourg-la-Rein" and insert -- Bourg-la-Reine --, therefor.

On the Title Page, in Item [56], under "OTHER PUBLICATIONS", in Column 2, Line 3, delete "Workship," and insert -- Workshop, --, therefor.

In the Specifications

Column 8, Line 57, delete "S-HH$_D$." and insert -- s-HH$_D$. --, therefor.

Column 9, Line 28, delete "length l," and insert -- length l$_x$ --, therefor.

Column 9, Line 63, delete "spatial-, temporal" and insert -- spatial-temporal --, therefor.

Column 11, Line 53, delete "Ibis" and insert -- 7bis --, therefor.

Column 12, Line 29, delete "S-HH$_3$" and insert -- s-HH$_3$ --, therefor.

Signed and Sealed this  
Sixth Day of May, 2014

Michelle K. Lee  
*Deputy Director of the United States Patent and Trademark Office*